(12) United States Patent
Cortequisse

(10) Patent No.: US 10,400,625 B2
(45) Date of Patent: Sep. 3, 2019

(54) LATTICE TYPE BLADE OF AN AXIAL TURBINE ENGINE COMPRESSOR

(71) Applicant: Techspace Aero S.A., Herstal (Milmort) (BE)

(72) Inventor: Jean-Francois Cortequisse, Heers (BE)

(73) Assignee: Safran Aero Boosters SA (BE)

(*) Notice: Subject to any disclaimer, the term of this patent is extended or adjusted under 35 U.S.C. 154(b) by 701 days.

(21) Appl. No.: 14/919,104

(22) Filed: Oct. 21, 2015

(65) Prior Publication Data

US 2016/0115822 A1 Apr. 28, 2016

(30) Foreign Application Priority Data

Oct. 28, 2014 (BE) .................................. 2014/0797

(51) Int. Cl.
*F01D 25/06* (2006.01)
*F01D 5/14* (2006.01)
(Continued)

(52) U.S. Cl.
CPC ............ *F01D 25/06* (2013.01); *B22F 3/1055* (2013.01); *B22F 5/04* (2013.01); *B22F 7/004* (2013.01);
(Continued)

(58) Field of Classification Search
CPC . F01D 5/147; F01D 5/28; F01D 5/282; F01D 5/284; B22F 5/04
See application file for complete search history.

(56) References Cited

U.S. PATENT DOCUMENTS 3,695,778 A * 10/1972 Taylor ..................... F01D 5/147
416/233
5,634,189 A * 5/1997 Rossmann ............ B22F 3/1109
428/547
(Continued)

FOREIGN PATENT DOCUMENTS

EP 0764764 A1 3/1997
EP 1447208 A2 8/2004
(Continued)

OTHER PUBLICATIONS

European Search Report from corresponding Belgium Application No. BE 201400797, dated Jun. 15, 2015.
(Continued)

*Primary Examiner* — Justin D Seabe
(74) *Attorney, Agent, or Firm* — Sandberg Phoenix & von Gontard P.C.

(57) ABSTRACT

The invention relates to a blade of a low-pressure compressor of an axial turbine engine. The blade comprises a vane in which a cavity is formed. The vane has a leading edge and a trailing edge, an intrados surface and an extrados surface which extend from the leading edge to the trailing edge, an outer casing which forms the intrados surface and the extrados surface and which delimits the cavity. The blade further comprises closed foam, such as a polymethacrylic foam, which blocks the cavity in order to isolate it from the environment of the blade. The blade further has a three-dimensional lattice which is formed in the cavity and which is integral with the vane of the blade. This barrier protects from chemical attacks and the introduction of impurities. The invention also relates to a production method for a hollow turbine engine blade which is filled with foam.

13 Claims, 3 Drawing Sheets

(51) Int. Cl.
*F01D 9/02* (2006.01)
*F01D 25/00* (2006.01)
*F04D 29/30* (2006.01)
*F04D 29/02* (2006.01)
*B22F 7/00* (2006.01)
*B22F 5/04* (2006.01)
*B22F 3/105* (2006.01)
*B22F 7/08* (2006.01)

(52) U.S. Cl.
CPC ............ *B22F 7/006* (2013.01); *B22F 7/08* (2013.01); *F01D 5/147* (2013.01); *F01D 9/02* (2013.01); *F01D 25/005* (2013.01); *F04D 29/023* (2013.01); *F04D 29/30* (2013.01); *F05D 2300/612* (2013.01); *Y02P 10/295* (2015.11); *Y02T 50/672* (2013.01); *Y02T 50/673* (2013.01)

(56) References Cited

U.S. PATENT DOCUMENTS

| | | | | |
|---|---|---|---|---|
| 5,634,771 | A * | 6/1997 | Howard | F01D 5/147 416/229 R |
| 6,884,507 | B2 * | 4/2005 | Lin | C08G 18/10 428/402.21 |
| 7,828,526 | B2 * | 11/2010 | Cairo | F01D 5/147 416/224 |
| 8,123,489 | B2 * | 2/2012 | Udall | F01D 5/147 29/889.72 |
| 8,225,506 | B2 * | 7/2012 | Chivers | F01D 5/147 264/261 |
| 2009/0016894 | A1 * | 1/2009 | Strother | B21D 26/055 416/241 R |
| 2013/0276461 | A1 | 10/2013 | Propheter-Hinckley et al. | |
| 2013/0294891 | A1 * | 11/2013 | Neuhaeusler | B22F 3/10 415/119 |

FOREIGN PATENT DOCUMENTS

| | | |
|---|---|---|
| EP | 1669144 A1 | 6/2006 |
| FR | 2954271 A1 | 6/2011 |

OTHER PUBLICATIONS

Evonik Industries, Rohacell A, Polymethacrylimide Foam, Aircraft Grade, (Product Information) Jan. 1, 2011.
Evonik Industries, Rohacell WF, Polymethacrylimide Foam, Aircraft Grade, (Product Information) Jan. 1, 2011.
Evonik Industries, Rohacell XT, Polymethacrylimide Foam, Aircraft Grade, (Product Information) Jan. 1, 2011.

* cited by examiner

LATTICE TYPE BLADE OF AN AXIAL TURBINE ENGINE COMPRESSOR

CROSS-REFERENCE TO RELATED APPLICATIONS

This application claims the benefit, under 35 U.S.C. § 119, of BE 2014/0797 filed Oct. 28, 2014, the disclosure of which is incorporated herein by reference in its entirety.

FIELD

The field of the present invention is that of turbine engines, in particular turbojets for aircraft. More specifically, the invention relates to axial turbine engine blades having an internal structure with a reinforcement lattice.

BACKGROUND

The compressors and the turbines of an axial turbine engine each comprise a plurality of annular rows of blades. They enable an annular flow of air to be accelerated, slowed, rectified or even redirected. These functions enable the flow to be compressed or a drive energy to be recovered therefrom. In order to perform these roles in the aeronautical field, the blades have to be light in order to reduce the mass of the turbine engine. The weight reduction is also equivalent to a reduction of inertia in the context of a rotor.

The optimization of the mass of a blade nonetheless has to comply with criteria of mechanical strength and thermal resistance. A blade has to withstand vibrations; and where applicable occurrences of ingestion of foreign bodies. In addition, the rotor blades are subjected to centrifugal force. All these parameters complicate the design of the blades, all the more so since they vary in each aspect. In order to provide custom-made blades which comply with the demands set out above, it is known to design then produce blades with lattice.

Document US2013/0276461 A1 discloses a hollow axial turbine engine blade. The blade has an internal cell which is delimited by an external skin which has an intrados surface and an extrados surface. The cell is occupied by a three-dimensional lattice with nodes between the rods thereof. The lattice connects the intrados and the extrados. Furthermore, it is integral with the skin as a result of an additive production method. This method uses a powder as a filler metal that is deposited then solidified in layers.

Such a type of blade provides a large degree of freedom of design, which simultaneously enables the mechanical strength and the mass to be optimized, as a result of the presence and the absence of material at different locations. The additive production imposes the provision of an opening in the cell in order to empty it of non-solidified powder. During operation, the opening exposes the cell to the environment of the blade, which can damage it and make it heavier, so that an imbalance may appear on a rotor which is provided with such blades.

SUMMARY

An object of the invention is to overcome at least one of the problems set out by the prior art. More specifically, an object of the invention is to limit the impact of the environment on a hollow blade which is produced by means of additive production based on layers of powder. Another object of the invention is to retain the balancing of a bladed rotor of a turbine engine.

It should be understood that the invention relates to a blade of an axial turbine engine, the blade having a foam core which is surrounded by another material which forms the body of the vane of the blade, including the intrados surface and/or extrados surface of the blade. The core defines a cavity in the material of the vane of the blade.

The invention also relates to a blade of an axial turbine engine, in particular for a compressor, the blade comprising: a vane which is intended to extend radially in a flow of the turbine engine; and a cavity which is formed in the material of the vane of the blade. The blade further comprises closed foam which blocks the cavity in order to isolate it from the environment of the blade.

According to various advantageous embodiments of the invention, the closed foam is a polymer foam, such as a polymethacrylic foam, optionally a polymethacrylimide foam.

According to various advantageous embodiments of the invention, the cavity has a width which is greater than the mean thickness of the vane, and/or the cavity represents the majority of the volume of the vane, and/or the majority of the radial height of the vane and/or the majority of the mean length of the vane.

According to various advantageous embodiments of the invention, the foam is present in the majority or all of the cavity, preferably the foam covers the majority or all of the inner surface of the cavity, more preferably the foam extends over the majority or all of the volume delimited by the cavity.

According to various advantageous embodiments of the invention, the cavity has an opening towards the environment of the blade, the foam blocking the opening, in various instances the opening has edges in the region of the environment, the foam being flush with the edges of the opening.

According to various advantageous embodiments of the invention, the blade comprises a lattice, which is optionally three-dimensional and which is arranged in the cavity in order to reinforce the blade, the lattice being mostly mixed with the foam. The lattice and the foam form the core of the vane.

According to various advantageous embodiments of the invention, the lattice comprises rods which are regularly distributed in the cavity and which are optionally rod junction nodes.

According to various advantageous embodiments of the invention, the lattice extends in the majority of the space of the cavity, e.g., in the entire space of the cavity.

According to various advantageous embodiments of the invention, the blade comprises a leading edge and a trailing edge, an intrados surface and an extrados surface which extend from the leading edge to the trailing edge, an outer casing which forms the intrados surface and the extrados surface and which delimits the cavity.

According to various advantageous embodiments of the invention, the casing has a constant thickness over the majority of the surface thereof, e.g., the casing is sealed over the entire surface thereof.

According to various advantageous embodiments of the invention, the thicknesses of the casing are generally constant over the entire radial height of the vane.

According to various advantageous embodiments of the invention, at a radial end of the vane, the blade comprises a fixing portion which forms a body in which the cavity extends, optionally the blade comprises closed foam in the continuation of the cavity radially in the region of the fixing portion.

According to various advantageous embodiments of the invention, it comprises a radial end with fixing means, the cavity opening in the radial end, optionally the fixing means comprise two fixing lugs which are axially opposed, the cavity opening axially between the fixing lugs.

According to various advantageous embodiments of the invention, the foam has pores, in particular closed pores, which represent more than 50%, e.g., more than 80%, e.g., more than 95%, of the volume thereof.

According to various advantageous embodiments of the invention, the density of the foam is less than 200 kg/m3, e.g., less than 100 kg/m3, e.g., less than or equal to 55 kg/m3.

According to various advantageous embodiments of the invention, the foam is less dense than the material of the vane of the blade, in various instances at least ten times less dense, in various other instances at least fifty times less dense.

According to various advantageous embodiments of the invention, the intrados surface is concave, in various instances the blade comprises a radial stack of aerodynamic profiles, at the intrados side at least one profile has an inwardly curved edge which approaches the extrados.

According to various advantageous embodiments of the invention, the casing forms the majority, for example all, of the intrados surface and/or the extrados surface of the blade.

According to various advantageous embodiments of the invention, the foam conforms to the inner surface of the cavity, optionally the foam adheres to the inner surface of the cavity.

According to various advantageous embodiments of the invention, the lattice is integral with the vane of the blade.

According to various advantageous embodiments of the invention, the lattice joins the intrados portion to the extrados portion of the casing and/or the portion of the leading edge to the portion of the trailing edge of the casing and/or the radially inner end of the vane to the radially outer end of the vane.

According to various advantageous embodiments of the invention, the closed foam comprises pores which are at least partially closed by the lattice, in particular by the lattice rods. The lattice and its rods are wrapped by closed pores of the closed foam. The pores are in contact with the lattice.

The invention also relates to a production method for a blade of an axial turbine engine, in particular of a low-pressure compressor; the method comprising the following steps: (a) production of a blade with a vane which is intended to extend radially in a flow of the turbine engine; and a cavity which is formed in the material of the vane of the blade; and the further step of: (b) filling the cavity of the vane with a closed foam in order to at least partially occupy the free space thereof, where applicable the blade is in accordance with the invention.

According to various advantageous embodiments of the invention, during the step (a) production, the blade is produced by means of additive production, e.g., by means of depositing layers of titanium and/or aluminium powder.

According to various advantageous embodiments of the invention, during the step (a) production, a lattice, which is optionally three-dimensional, is formed simultaneously with the vane of the blade inside the cavity.

According to various advantageous embodiments of the invention, during the step (b) filling, the precursor material of the closed foam is poured onto the lattice and/or injected into the cavity.

According to various advantageous embodiments of the invention, at the end of the step (b) filling, the cavity is primarily occupied, e.g., completely occupied, by the foam.

It is set out that the foam occupies the cavity as a result of the structuring material thereof and as a result of the emptiness of the pores thereof.

The invention also relates to a turbine engine comprising a blade in accordance with the invention, and/or the blade is produced in accordance with a production method according to the invention. In various instances, the turbine engine is a dual-flow turbojet.

The invention allows the cavity of the blade to be protected by applying foam thereto. The sealed barrier formed by the foam protects both against chemical attacks and against the introduction of impurities. The presence of the lattice affords the advantage of providing a homogeneous support to the foam. It can become attached thereto at a large number of locations and surfaces which are distributed in the cavity. In this manner the foam is held in an optimum manner, in particular against the vibrations of the turbine engine, or against the centrifugal force in the case of a rotor blade.

The closed appearance of the foam forms a shock absorber, an impact absorber since the bubbles of the foam can become resiliently compressed in order to take up an impact in the event of ingestion. Optionally, the viscoelastic appearance of the foam enables vibrations of the integral blade to be attenuated without affecting the inertia thereof.

In the case of complex structures, specific particles or grains of powder can become detached after the operation for removal of non-solidified powder. The presence of the foam allows precisely these grains of powder to be trapped. Consequently, the production of even more complex shapes is permitted, without the addition of any restriction linked to the cleaning which in addition becomes more rapid.

DRAWINGS

DESCRIPTION

In the following description, the terms inner or internal and outer or external refer to a positioning relative to the rotation axis of an axial turbine engine.

Figure 1:
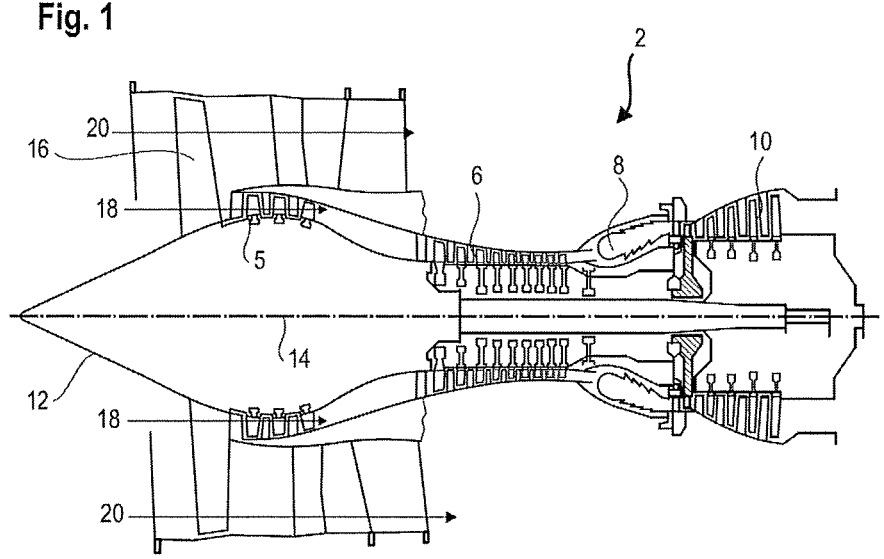
FIG. 1 shows an axial turbine engine according to various embodiments of the invention.

FIG. 1 shows an axial turbine engine in a simplified manner. In this specific case, it is a dual-flow turbojet. The turbojet 2 comprises a first compression level, referred to as a low-pressure compressor 5, a second compression level, referred to as a high-pressure compressor 6, a combustion chamber 8 and one or more turbine levels 10. During operation, the mechanical power of the turbine 10 transmitted via the central shaft as far as the rotor 12 moves the two compressors 5 and 6. They comprise several rows of rotor blades which are associated with rows of stator blades. The rotation of the rotor about the rotation axis 14 thereof thus enables a flow of air to be generated and to be progressively compressed until being introduced into the combustion chamber 8. Step-down means can increase the rotation speed transmitted to the compressors.

An inlet ventilator which is generally designated a fan or a blower 16 is coupled to the rotor 12 and generates a flow of air which is divided into a primary flow 18 which passes through the different above-mentioned levels of the turbine engine and a secondary flow 20 which passes through an annular conduit (partially illustrated) along the machine in order to then rejoin the primary flow at the output of the turbine. The secondary flow 20 can be accelerated in order to generate a reactive thrust. The primary flow 18 and secondary flow 20 are annular flows, they are channelled by the housing of the turbine engine. To this end, the housing has cylindrical walls or shrouds which can be internal and external.

Figure 2:
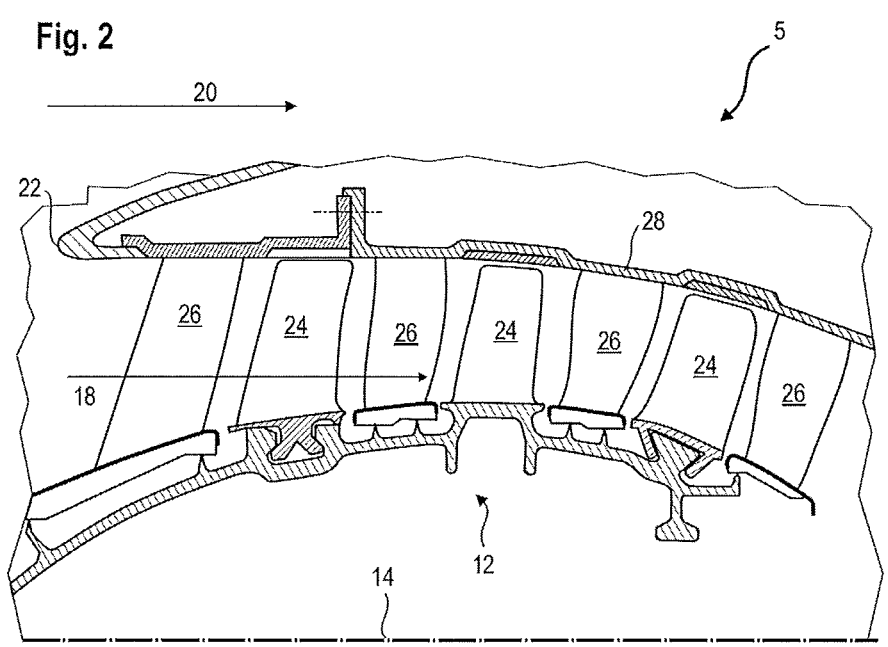
FIG. 2 shows a turbine engine compressor according to various embodiments of the invention.

FIG. 2 is a sectioned view of a compressor of an axial turbine engine such as that of FIG. 1. The compressor can be a low-pressure compressor 5. It is possible to see therein the separation nozzle 22 of the primary flow 18 and the secondary flow 20. The rotor 12 comprises several rows of rotor blades 24, exemplarily in this instance three.

The rotor 12 can have the same type of rotor blades 24 or different types of rotor blades 24. The rotor 12 can comprise a drum and/or discs. It can also comprise rotor blades 24 which are welded to the drum as well as a disc, and/or rotor blades 24 which are fitted in annular blade assembly grooves and/or countersunk in an annular retention body. Accordingly, a rotor blade 24 comprises a vane which is welded to a tubular platform of the rotor, or to a stub of the rotor 12. Alternatively, a rotor blade 24 can have a fixing portion with inclined fixing lugs which conform to the inner surface of the annular body or the inner surface of the annular groove.

The low-pressure compressor 5 comprises a plurality of rectifiers, exemplarily in this instance four, which each contain a row of stator blades 26. The rectifiers are associated with the fan or a row of rotor blades 24 in order to rectify the flow of air, in order to convert the flow speed into static pressure.

The stator blades 26 extend substantially radially from an outer housing 28 and can be fixed thereto using a threaded shaft, or rivets. They can also have a platform which is pressed against the outer housing 28, the shaft radially extending the platform. Each platform has portions which extend from the vane of the associated blade, the portions forming axial and/or lateral lugs.

Figure 3:
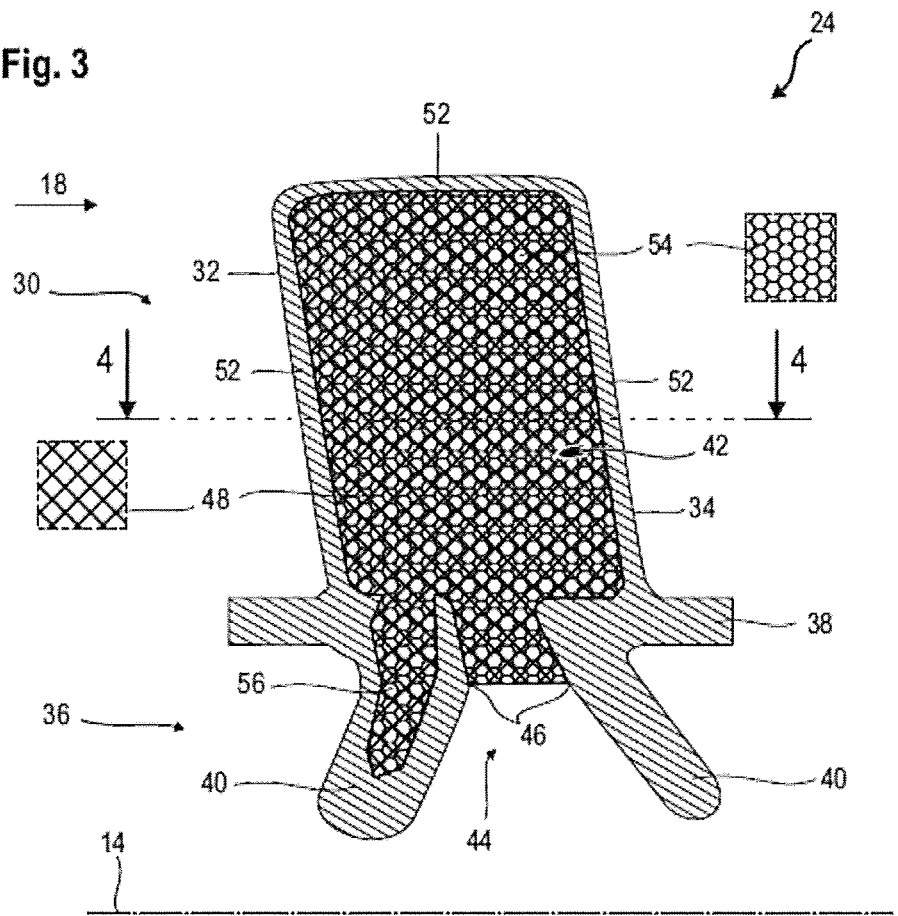
FIG. 3 illustrates a turbine engine blade according to various embodiments of the invention.

FIG. 3 is a cross-section of a blade according to the invention. The rotation axis 14 is illustrated. The blade set out in this instance is a rotor blade 24; it could also be a stator blade such as those described above. Alternatively, in this instance, the present teaching can be applied to a fan blade of a turbine engine.

The blade 24 comprises a vane 30, or aerofoil, which is intended to extend radially in the primary flow 18 of the turbine engine. The vane 30 has a leading edge 32 and a trailing edge 34; and an intrados surface and an extrados surface which extend from the leading edge 32 to the trailing edge 34. It further shows a head and a fixing portion 36 in the region of the inner end thereof, the portion 36 extends the blade 30 towards the inner side. The portion 36 can have a platform 38 whose outer surface delimits and guides the primary flow 18. The portion 36 has fixing means, such as fixing lugs 40.

The material of the vane 30 of the blade 24 has a cavity 42 or recess. This cavity 42 extends over the majority of the height of the blade 30, or substantially the entire radial height thereof. The cavity 42 can represent the majority of the volume of the blade 30. The cavity 42 has a passage or opening 44 which is in communication with the environment of the blade 24 and the opening is delimited by edges 46. The opening 44 forms a waist in the cavity toward the blade's environment. Here, the opening can become narrower. The cavity 42 can exhibit a shoulder or a collar around the opening and inside the cavity.

The blade comprises a lattice 48 in the cavity 42. It can be present in the majority of the cavity 42, in various instances in the entire cavity 42, of the blade 30. The lattice 48 can connect the leading edge 32 to the trailing edge 34 over the entire height of the vane 30. The lattice 48 can be planar and/or be formed in accordance with a skew surface, for example, parallel with the radial extension of the intrados surface or the extrados surface. It can be substantially bidirectional, for example, having planar meshes which are formed by the rods thereof.

The lattice 48 can also be a three-dimensional lattice 48. It can have polyhedral meshes which are delimited by the rods. The lattice 48 is connected to each inner surface of the cavity 42 in order to form a three-dimensional internal reinforcement structure of the blade 24. The meshes can be tetrahedrons and/or cubes. The rods thereof can be arranged in accordance with at least three directions which are, for example, perpendicular to each other. The rods thereof can be distributed or scattered in the space of the cavity, in various embodiments, in a homogeneous manner.

The lattice 48 can form a plurality of meshes in accordance with the thickness of the vane, for example, at least two, for example at least five, e.g., at least ten meshes. The compact nature of the lattice is less than 90%, for example less than 50%, e.g., less than 5%.

The blade 24 has a skin 52 or shell 52 or casing 52 which forms the intrados surface thereof, the extrados surface thereof, the leading edge 32 thereof, and the trailing edge 34 thereof. The casing 52 can have a constant thickness over the majority of the height of the blade 24, in various instances over the entire radial height of the blade 30. The casing 52 is in contact with the flow of the turbine engine and extends over the majority of the radial height of the primary flow 18.

The blade 24 further comprises closed foam 54 in the cavity 42, which enables it to be hermetically sealed. It can substantially form a stopper in the region of the opening 44 in order to seal the cavity 42 in a tight manner; the volume thereof can have less than 10% of the volume of the cavity 42. It can be present in the majority of the volume of the cavity 42, or in all of it. It is combined with the lattice 48, it can be mixed therewith over the majority of the volume thereof. It covers the rods of the lattice and occupies the gaps; the polyhedrons formed between the rods. As a result of the presence of the foam 54, the space of the cavity 42 becomes inaccessible to the environment. Consequently, the impurities and the chemical agents cannot be introduced therein. The risk of occurrence of imbalance and/or chemical attack is thus reduced. In the absence of foam, the blade would have a passage which connects the opening to the base.

The foam 54 is advantageously a closed foam 54 in order to ensure the sealing. The term closed foam 54 is intended to be understood to be a foam with closed pores or closed cells which are isolated from each other. This configuration promotes the sealing which the foam can provide. It can be a polymer foam, such as a polymethacrylic foam, in various instances a polymethacrylimide foam. The density thereof is substantially reduced, it can be less than 52 kg/m3. In this manner, the presence thereof does not significantly modify the mass of the blade 24 since the base material thereof, optionally titanium and/or aluminium, has a density at least ten times, or at least fifty times, or at least eighty times greater than that of the closed foam.

The fixing portion 36 can have at least one cell 56, for example, formed in one or each fixing lug 40. The cell 56 can also be occupied by the foam 54 and the lattice 48, which enables the lug 40 to be made lighter, without the cell 56 being exposed to the environment of the blade 24.

Figure 4:
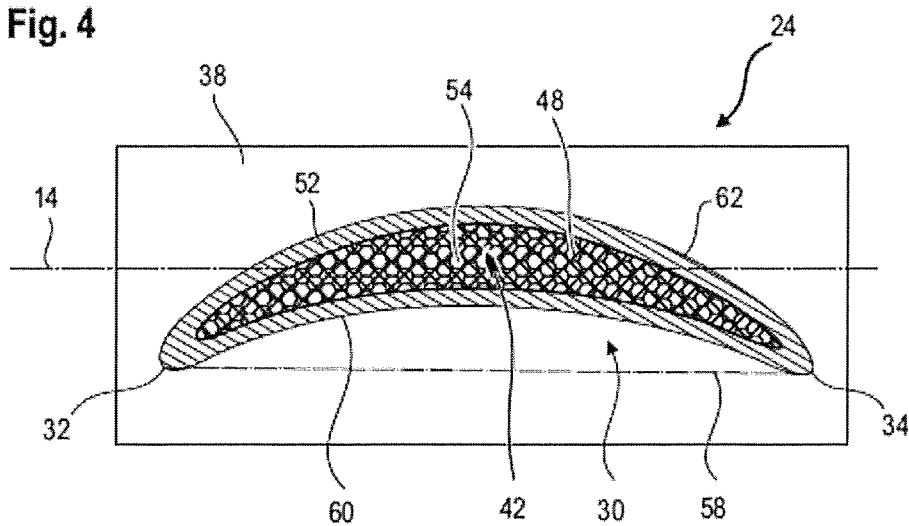
FIG. 4 is a cross-section of the blade according to various embodiments of the invention along the axis 4-4 drawn in FIG. 3.

FIG. 4 shows a cross-section of the blade 24 along an axial plane 4-4 which is drawn in FIG. 3. This cross-section forms an aerodynamic profile of the vane 30 of the blade 24. The rotation axis 14 and the platform 38 are illustrated.

The cavity 42 can represent the majority of the length of the vane 30, or substantially the entire length thereof; the length being taken to be along the chord 58 of the vane 30. The cavity 42 can represent the majority of the mean thickness of the vane 30, or substantially the entire width thereof; the width being taken perpendicularly relative to the chord 58 of the vane 30.

The lattice 48 and/or the foam 54 occupy/ies the majority of the length and/or the width of the cavity 42, in various instances the entire length and/or the entire width thereof. The foam 48 can adhere to the inner surface of the casing 52 in order to improve the retention thereof. The lattice 48 connects the intrados portion 60 to the extrados portion 62 of the casing 52, which improves the rigidity of the blade. The intrados surface 60 can have a concave portion whose arch is held by the lattice 48.

For one or each profile of the blade 24, the lattice 48 and/or the foam 54 sweep the majority of the chord 58 of the blade 24, e.g., generally the entire chord 58 of the blade. The association of the foam 54 and the lattice 48 can form a composite material which benefits from the qualities of each material.

Figure 5:
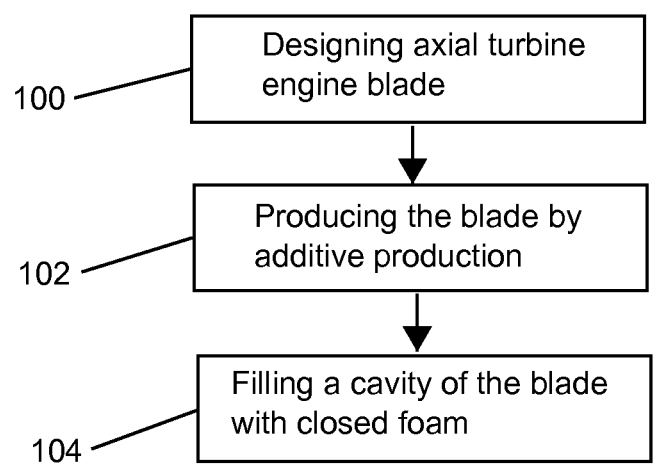
FIG. 5 shows a production method of the blade according to various embodiments of the invention.

FIG. 5 shows a chart of a production method of a turbine engine blade such as the one illustrated and described in relation to FIGS. 3 and 4.

The method can comprise the linking of the following steps, optionally carried out in this order:

(a) designing of an axial turbine engine blade, as illustrated at 100. The blade comprising a vane, a cavity which is formed in the vane and delimited by the casing of the blade, a lattice which is accommodated in the cavity, a fixing portion.

(b) production by means of additive production based on layers of powder of the blade designed during step (a), as illustrated at 102.

(c) filling of the cavity of the blade produced during production step (b), with closed foam by pouring the precursor material of the foam onto the lattice at that location, via the opening remaining after the production by means of additive production, as illustrated at 104. In various implementations, a portion of the additive material of the blade is provided in the form of a progressively molten wire.

As a result of the production method, the casing, the fixing portion and the lattice are integral, which improves the mechanical strength of the blade. The lattice provides the connection and reinforcement functions thereof which connects the inner surfaces of the blade as far as the fixing portion. The blade can form an integral element with a mixed structure, with a plurality of solid portions, but with different densities and a number of different materials.

The method further enables a blade to be produced which is both light and resistant, without it being subjected to the operating conditions of the turbine engine. In this manner, during the design step (a), it is permitted to reduce specific safety coefficients which act as a margin with respect to uncertainties. The step design step (a) is optional in the invention since the blade can be produced from a model which has already been designed. This step can be included in the method of the invention when the shapes of the blade are adapted to the production constraints.

Additive production is a production method which is well known to the person skilled in the art. An additive material, for example, in the form of powder, is deposited in superimposed layers. Each layer is solidified by means of heating in order to create a cohesion of the powder. The heat which allows the melting point of the powder to be reached can be supplied by a laser or an electron beam. It is alternatively possible to solidify power at the same time as it is deposited.

The surface of the rods of the lattice can have a granular appearance, with protruding shapes and recessed shapes. This granular appearance can result from the use of grains as additive material, which partially retain their initial geometries in spite of the melting. The surface of the rods can have a roughness Ra greater than 5 µm, e.g., greater than 50 µm. The roughness Ra corresponds to the integral mean of the deviations in terms of absolute value of the height variations of a given profile. This surface state improves the adhesion of the foam on the rods.

What is claimed is:

1. A blade of an axial turbine engine, the blade comprising:
    a vane which is intended to project radially in a flow of the turbine engine;
    a cavity which is formed in of the vane of the blade;
    a reinforcing lattice within the cavity; and
    a closed foam in contact with the reinforcing lattice and closing the cavity in order to isolate the cavity from the exterior of the blade, the reinforcing lattice being polyhedral meshes delimited by rods arranged in at least three directions and the lattice forming a plurality of meshes in accordance with the thickness of the vane, wherein the blade comprises a radial end with a fixing portion, the cavity comprising an opening in the radial end, and the fixing portion comprising two fixing lugs which are axially opposed, wherein the opening is filled with the closed foam and is axially between the two fixing lugs, and wherein at least one of the two fixing lugs has a cell being connected with the cavity, wherein the reinforcing lattice extends in the cell and the cell is filled with the closed foam.

2. The blade in accordance with claim 1, wherein the closed foam is polymer foam.

3. The blade in accordance with claim 1, wherein the cavity has a volume and the foam is present in more than half of the volume of the cavity.

4. The blade in accordance with claim 1, wherein, the opening forms a waist between the cavity and the exterior of the blade, the closed foam tightly closing the opening.

5. The blade in accordance with claim 1, wherein the lattice comprises rods that are distributed in the cavity and that have rod junction nodes.

6. The blade in accordance with claim 1, wherein the cavity has a volume and the lattice extends in more than half of the volume of the cavity.

7. The blade in accordance with claim 1, wherein the blade comprises a leading edge, a trailing edge, an intrados surface and an extrados surface that extend from the leading edge to the trailing edge, an outer shell which forms the intrados surface and the extrados surface and that delimits the cavity.

8. The blade in accordance with claim 7, wherein the shell has a constant thickness over the entirety of the intrados and the extrados surfaces, the shell being tight over the entire surface of the intrados and the extrados.

9. The blade in accordance with claim 7, wherein the vane has a radial height and the thicknesses of the shell are constant over the radial height of the vane.

10. The blade in accordance with claim 1, wherein the foam has pores that occupy more than 50% of the foam, and wherein the density of the foam is less than 200 kg/m3.

11. A production method for a blade of an axial turbine engine, the method comprising:
production of a blade with a vane that is intended to extend radially in a flow of the turbine engine; and a cavity that is formed in the vane of the blade, wherein the production of the blade comprises producing the blade by additive manufacturing by depositing powder layers, wherein the production of the blade comprises simultaneously forming a reinforcing lattice inside the cavity and the vane of the blade, wherein, at a radial end of the vane, the blade comprises a fixing portion comprising two fixing lugs, wherein at least one of the two fixing lugs has a cell being connected with the cavity, wherein the reinforcing lattice extends in the cell;
filling of the cavity through an opening of the vane with a closed foam in order to at least partially occupy a free space of the cavity and the cell, the opening being formed
at the radial end with the fixing portion and arranged axially between the two fixing lugs, the cavity being opened through the radial end.

12. The production method in accordance with claim 11, wherein filling the cavity and the cell comprises one of:
pouring a precursor material of the closed foam onto the lattice; and
injecting the precursor into the cavity and the cell.

13. The production method in accordance with claim 11, wherein, at the end of filling the cavity and the cell with the closed foam, the cavity and the cell are completely occupied by the foam.

* * * * *